US012698601B1

(12) United States Patent
Sylvester et al.

(10) Patent No.: US 12,698,601 B1
(45) Date of Patent: Aug. 4, 2026

(54) SYSTEMS AND METHODS FOR PRECAST SLAB CONSTRUCTION AND MAINTENANCE

(71) Applicant: INTEGRATED ROADWAYS IP LLC, Miami Beach, FL (US)

(72) Inventors: Tim Sylvester, Kansas City, MO (US); Tiziano Pedersoli, Overland Park, KS (US)

(73) Assignee: INTEGRATED ROADWAYS IP LLC, Miami Beach, FL (US)

( * ) Notice: Subject to any disclaimer, the term of this patent is extended or adjusted under 35 U.S.C. 154(b) by 882 days.

(21) Appl. No.: 18/053,798

(22) Filed: Nov. 9, 2022

(51) Int. Cl.
*E01C 5/00* (2006.01)
*E01C 5/10* (2006.01)
*H02G 3/06* (2006.01)

(52) U.S. Cl.
CPC ............. *E01C 5/10* (2013.01); *H02G 3/0616* (2013.01); *E01C 2201/12* (2013.01)

(58) Field of Classification Search
None
See application file for complete search history.

(56) References Cited

U.S. PATENT DOCUMENTS

| | | | | |
|---|---|---|---|---|
| 552,445 | A | * | 12/1895 | Platt ........................... E01C 5/00 |
| | | | | 404/2 |
| 2,521,540 | A | * | 9/1950 | Richardson ............. E04C 2/521 |
| | | | | 219/541 |
| 2,619,580 | A | * | 11/1952 | Pontiere .............. F24D 19/1096 |
| | | | | 219/528 |

| | | | | |
|---|---|---|---|---|
| 3,069,522 | A | | 12/1962 | Jamison |
| 4,321,589 | A | * | 3/1982 | King ....................... G08G 1/087 |
| | | | | 340/941 |
| 4,564,745 | A | | 1/1986 | Deschenes |
| 5,550,350 | A | | 8/1996 | Barnes |
| 6,127,653 | A | | 10/2000 | Samuels |
| 10,113,273 | B2 | | 10/2018 | Consiglio et al. |
| 10,407,838 | B1 | * | 9/2019 | Sylvester ................ E01C 11/00 |
| 11,661,712 | B2 | * | 5/2023 | Simovich .................. E01C 5/00 |
| | | | | 404/25 |
| 12,320,081 | B2 | * | 6/2025 | Simovich .............. E01C 11/265 |
| 2011/0021050 | A1 | | 1/2011 | Byrne |
| 2011/0253694 | A1 | | 10/2011 | Consiglio |

(Continued)

FOREIGN PATENT DOCUMENTS

| | | | | | |
|---|---|---|---|---|---|
| CN | 109898382 | A | * | 6/2019 | .............. E01C 5/04 |
| CN | 110080052 | A | | 8/2019 | |

(Continued)

*Primary Examiner* — Christopher J Sebesta
*Assistant Examiner* — Katherine J Chu
(74) *Attorney, Agent, or Firm* — Fredrikson & Byron, P.A.

(57) ABSTRACT

A precast slab roadway and methods of constructing and maintaining the same. A construction method comprises pulling a distal portion of an electrical conductor from a distal end of a subgrade conduit so that a slack portion is drawn into the subgrade conduit, electrically connecting the electrical conductor to an electrical component of a junction box, electrically connecting an electrical component of a corresponding distal slab to the distal end of the electrical conductor, lowering the distal slab onto a substrate adjacent to a proximal slab, and pulling the slack portion of the electrical conductor out of the subgrade conduit so the distal portion of the electrical conductor is drawn into the subgrade conduit.

26 Claims, 9 Drawing Sheets

(A - A)

(56) References Cited

U.S. PATENT DOCUMENTS

| | | | |
|---|---|---|---|
| 2011/0302858 A1 | 12/2011 | Siewert | |
| 2023/0145623 A1* | 5/2023 | Alalusi | ................ G01S 5/0284 |
| | | | 701/500 |
| 2024/0006922 A1* | 1/2024 | Covic | .................... H02J 50/12 |

FOREIGN PATENT DOCUMENTS

| | | | | | |
|---|---|---|---|---|---|
| GB | 2552191 A | * | 1/2018 | .............. | B60M 7/00 |
| GB | 2609889 A | * | 2/2023 | .............. | E01C 9/00 |
| JP | H1171707 A | | 3/1999 | | |
| JP | 2022035255 A | * | 3/2022 | | |

* cited by examiner (A - A)

(A - A)

(A - A)

(A - A)

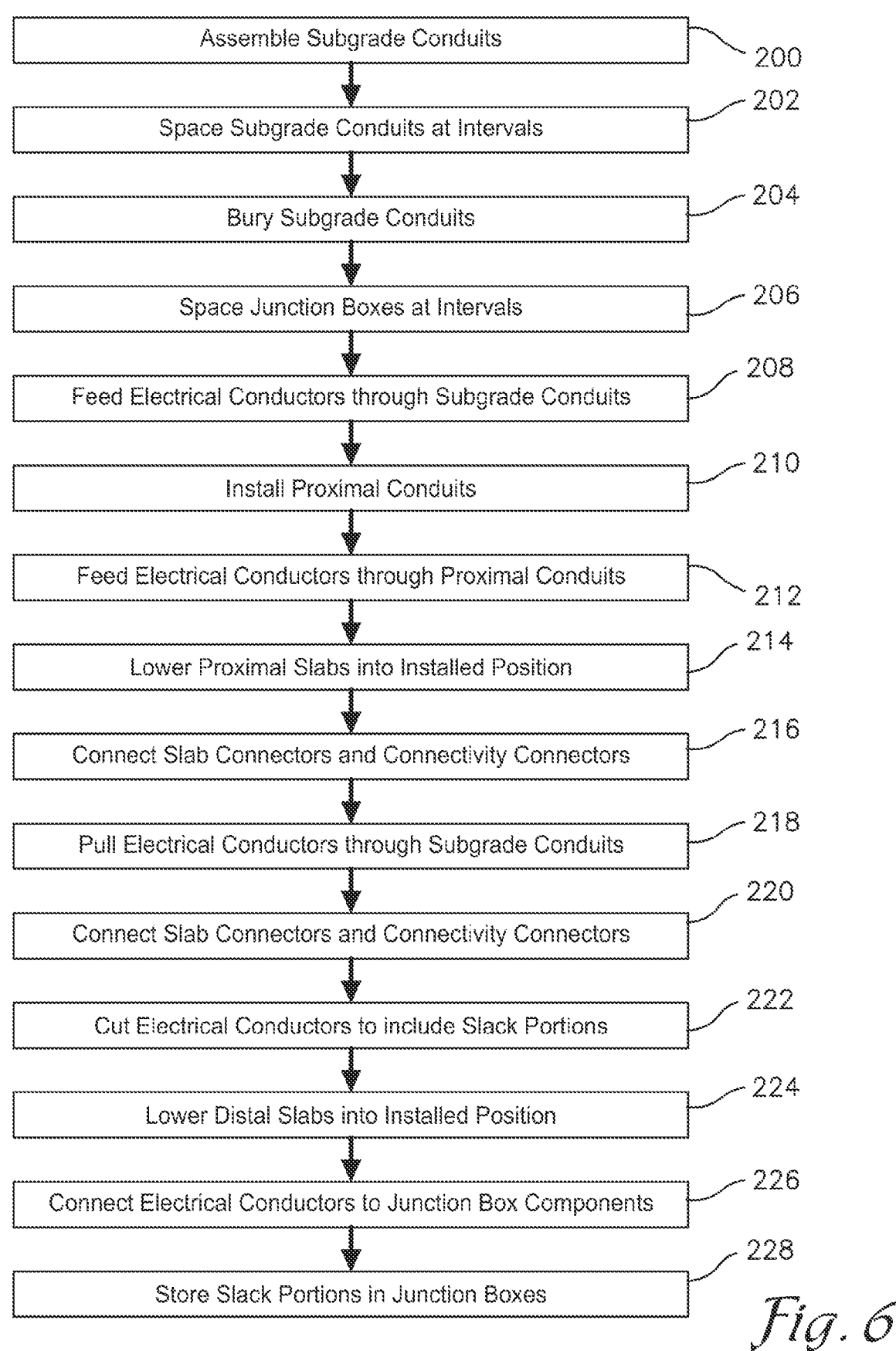

Assemble Subgrade Conduits — 200

Space Subgrade Conduits at Intervals — 202

Bury Subgrade Conduits — 204

Space Junction Boxes at Intervals — 206

Feed Electrical Conductors through Subgrade Conduits — 208

Install Proximal Conduits — 210

Feed Electrical Conductors through Proximal Conduits — 212

Lower Proximal Slabs into Installed Position — 214

Connect Slab Connectors and Connectivity Connectors — 216

Pull Electrical Conductors through Subgrade Conduits — 218

Connect Slab Connectors and Connectivity Connectors — 220

Cut Electrical Conductors to include Slack Portions — 222

Lower Distal Slabs into Installed Position — 224

Connect Electrical Conductors to Junction Box Components — 226

Store Slack Portions in Junction Boxes — 228

*Fig. 6*

Lift Distal Slab to Maintenance Position — 300

Disconnect Electrical Conductor from Distal Slab — 302

Perform Maintenance or Modification — 304

Reconnect Electrical Conductor to Distal Slab — 306

Lower Distal Slab into Installed Position — 308

Pull Slack Portion of Electrical Conductor out of Subgrade Conduit — 310

Store Slack Portion in Junction Box — 312

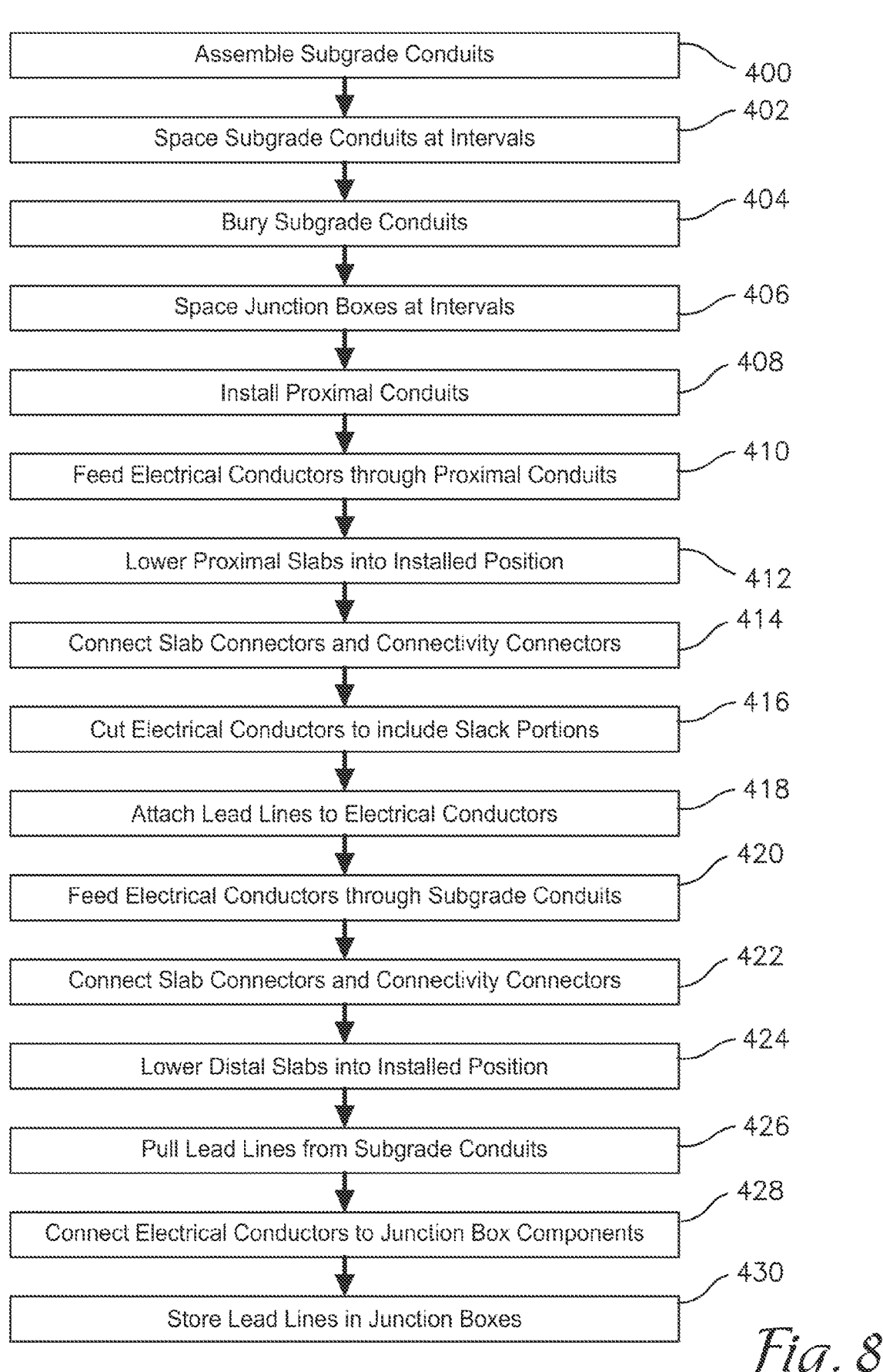

Assemble Subgrade Conduits — 400

Space Subgrade Conduits at Intervals — 402

Bury Subgrade Conduits — 404

Space Junction Boxes at Intervals — 406

Install Proximal Conduits — 408

Feed Electrical Conductors through Proximal Conduits — 410

Lower Proximal Slabs into Installed Position — 412

Connect Slab Connectors and Connectivity Connectors — 414

Cut Electrical Conductors to include Slack Portions — 416

Attach Lead Lines to Electrical Conductors — 418

Feed Electrical Conductors through Subgrade Conduits — 420

Connect Slab Connectors and Connectivity Connectors — 422

Lower Distal Slabs into Installed Position — 424

Pull Lead Lines from Subgrade Conduits — 426

Connect Electrical Conductors to Junction Box Components — 428

Store Lead Lines in Junction Boxes — 430

*Fig. 8*

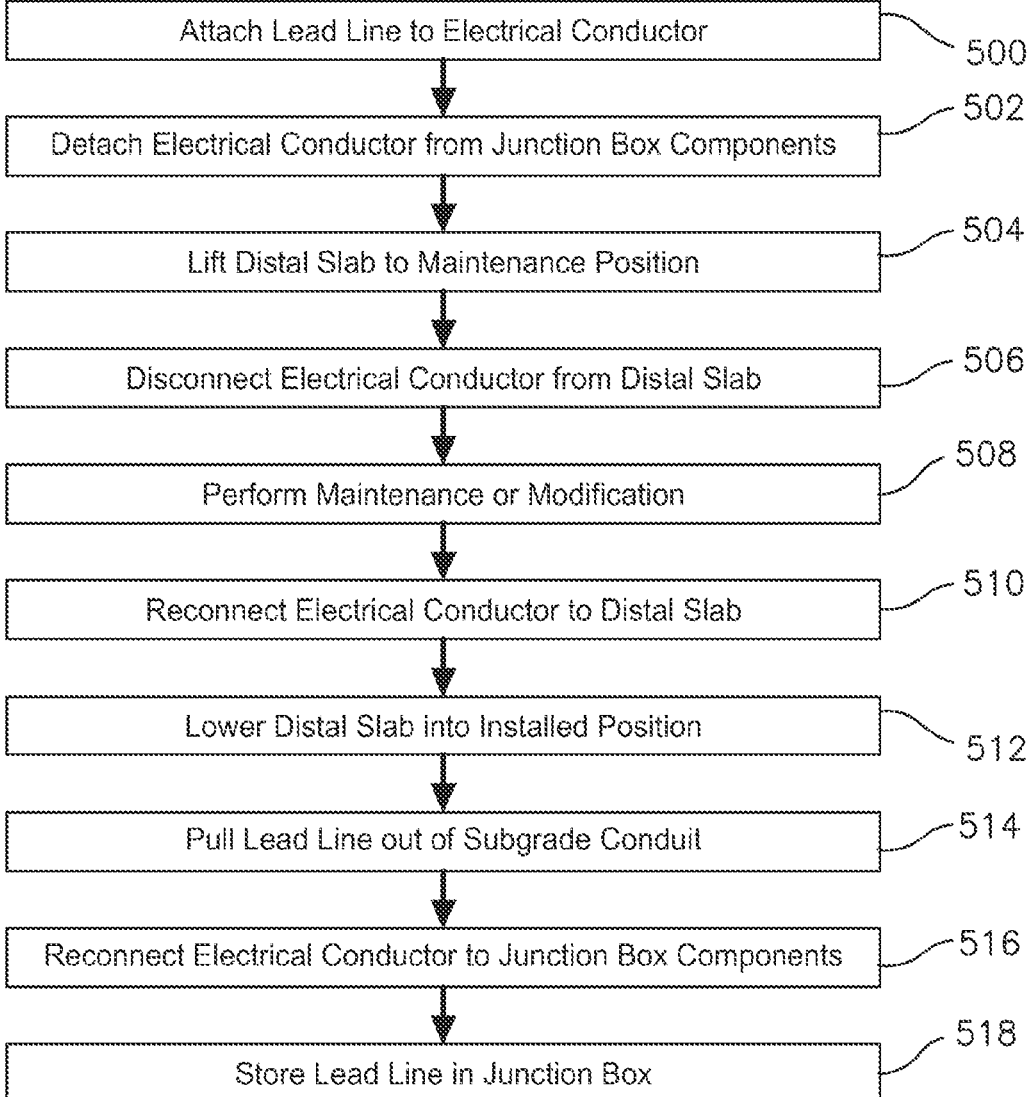

Attach Lead Line to Electrical Conductor — 500

Detach Electrical Conductor from Junction Box Components — 502

Lift Distal Slab to Maintenance Position — 504

Disconnect Electrical Conductor from Distal Slab — 506

Perform Maintenance or Modification — 508

Reconnect Electrical Conductor to Distal Slab — 510

Lower Distal Slab into Installed Position — 512

Pull Lead Line out of Subgrade Conduit — 514

Reconnect Electrical Conductor to Junction Box Components — 516

Store Lead Line in Junction Box — 518

*Fig. 9*

SYSTEMS AND METHODS FOR PRECAST SLAB CONSTRUCTION AND MAINTENANCE

CROSS-REFERENCE TO RELATED APPLICATIONS

Contemporaneously Filed Applications

The present application is filed contemporaneously with U.S. patent application Ser. No. 18/053,814, entitled SYSTEMS AND METHODS FOR PRECAST SLAB CONSTRUCTION AND MAINTENANCE, filed Nov. 9, 2022, the entire disclosure of which is hereby incorporated by reference herein.

BACKGROUND

Pre-fabricated or precast modular pavement slabs have traditionally offered an attractive alternative to continuous pour systems at least because they can be individually removed, repaired, and/or replaced with relative ease. Traditional continuous pour systems require significantly more time and/or money for removal and replacement.

However, existing pre-fabricated, modular pavement slab systems are not configured for efficient installation, use, maintenance, and/or repair in connection with various embedded components. There is a need for a new modular pavement slab system and corresponding methods for installation, maintenance, and/or repair.

SUMMARY

An embodiment of the invention is a method of constructing a precast slab roadway. The method broadly comprises passing an electrical conductor through a subgrade conduit so that a distal end of the electrical conductor extends out of a distal end of the subgrade conduit and so that a proximal end and an adjacent proximal slack portion of the electrical conductor extend out of a proximal end of the subgrade conduit. The slack portion has a length equal to or greater than a height difference between a maintenance position of a corresponding distal slab and an installed position of the corresponding distal slab. The method further comprises installing the subgrade conduit beneath a proximal slab.

The method further comprises pulling a distal portion of the electrical conductor adjacent the distal end of the electrical conductor from the distal end of the subgrade conduit so that the slack portion is drawn into the subgrade conduit, electrically connecting the electrical conductor to an electrical component of the junction box, electrically connecting an electronic component of the corresponding distal slab to the distal end of the electrical conductor, and lowering the distal slab onto a substrate adjacent to the proximal slab. The method further comprises pulling the slack portion of the electrical conductor out of the subgrade conduit so the distal portion of the electrical conductor is drawn into the subgrade conduit.

Another embodiment is a method of maintaining a precast slab roadway. The method broadly comprises lifting a distal slab adjacent to a proximal slab from an installed position to a maintenance position so that the distal slab pulls a distal portion of an electrical conductor out of a distal end of a subgrade conduit underneath the proximal slab. The lifting draws a slack portion of the electrical conductor from a junction box adjacent the proximal slab opposite the distal slab into a proximal end of the subgrade conduit. The slack portion has a length equal to or greater than a height difference between the maintenance position and the installed position.

The method further comprises performing a maintenance action or a modification action on at least one of the distal slab, the proximal slab, an electrical component, and a substrate configured to support the distal slab. The method also includes lowering the distal slab from the maintenance position to the installed position on the substrate adjacent to the proximal slab and pulling the slack portion of the electrical conductor out of the proximal end of the subgrade conduit so the distal portion of the electrical conductor is drawn into the distal end of the subgrade conduit.

Yet another embodiment is a precast slab roadway broadly comprising a number of proximal slabs arranged end-to-end forming an inner lane and a number of distal slabs arranged end-to-end adjacent to the proximal slabs forming an outer lane. Each of the distal slabs is configured to be raised from an installed position to a maintenance position.

The precast slab roadway further comprises a roadway electrical component system including a number of junction boxes, a number of electrical components in the proximal slabs and in the distal slabs, a number of subgrade conduits, and a set of electrical conductors. The junction boxes are adjacent to the proximal slabs opposite the distal slabs and include a number of electrical components.

Each of the subgrade conduits extend below the proximal slabs from the junction boxes to the distal slabs and include a proximal end. The electrical conductors extend through the subgrade conduits and electrically connect the electrical components in the distal slabs to the electrical components of the junction boxes. Each of the electrical conductors includes a proximal end including a slack portion extending out of the corresponding proximal end of one of the subgrade conduits. The slack portion has a length equal to or greater than a height difference between the maintenance position of a corresponding distal slab and the installed position of the corresponding distal slab.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing FIGURES, wherein:

FIG. 6 is a flow diagram of certain method steps of an embodiment of the invention;

FIG. 8 is a flow diagram of certain method steps of another embodiment of the invention; and FIG. 9 is a flow diagram of certain method steps of another embodiment of the invention.

Figure 1:
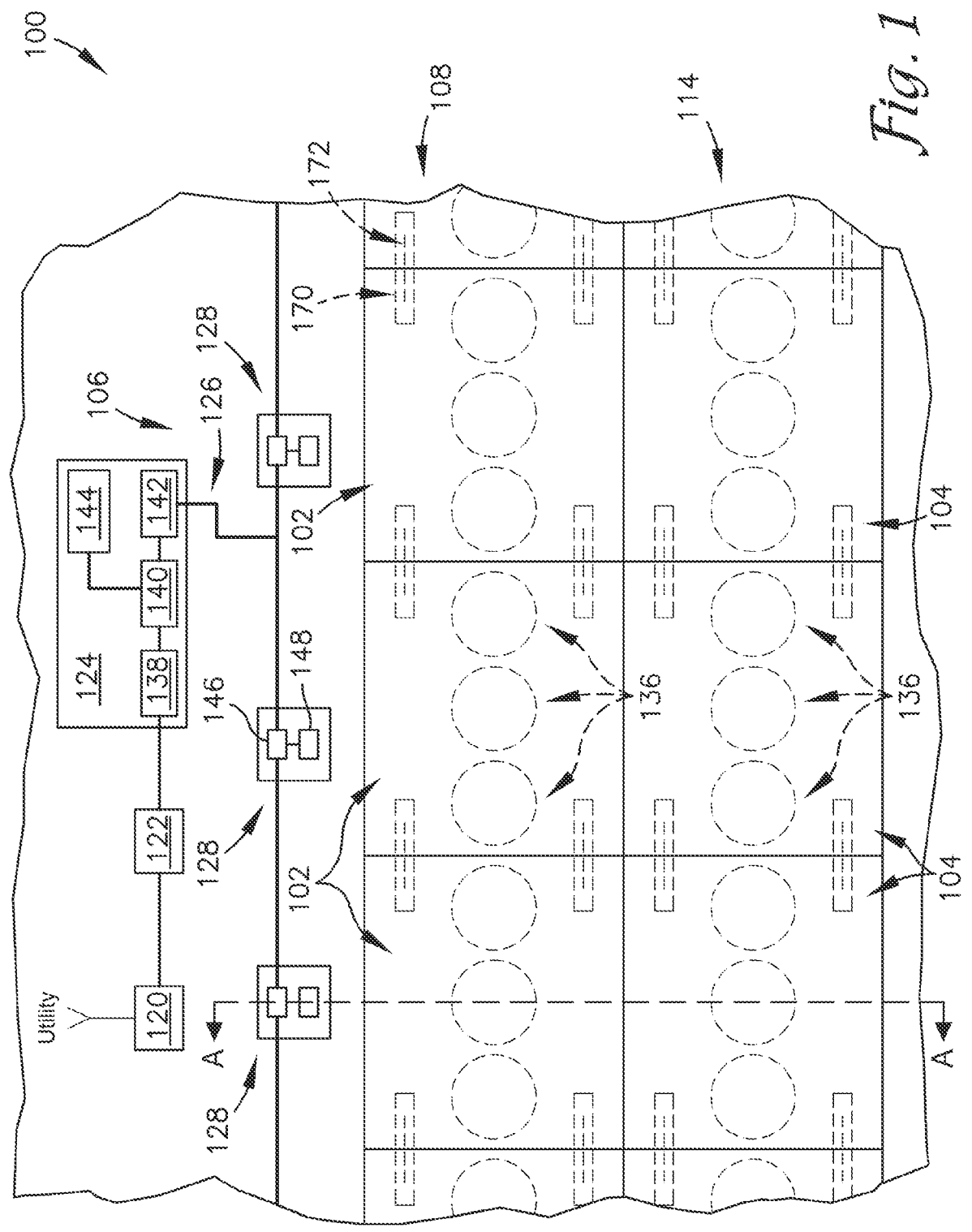
FIG. 1 is a plan view of a precast slab roadway constructed in accordance with an embodiment of the invention.

The drawing FIGURES do not limit the current invention to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one or more embodiments may also be included in other embodiments, but is not necessarily included. As used in the specification and in the claims, ordering words such as "first" and "second" are used to distinguish between similar components and do not imply specific components. Thus, the current technology can include a variety of combinations and/or integrations of the embodiments described herein.

Figure 2:
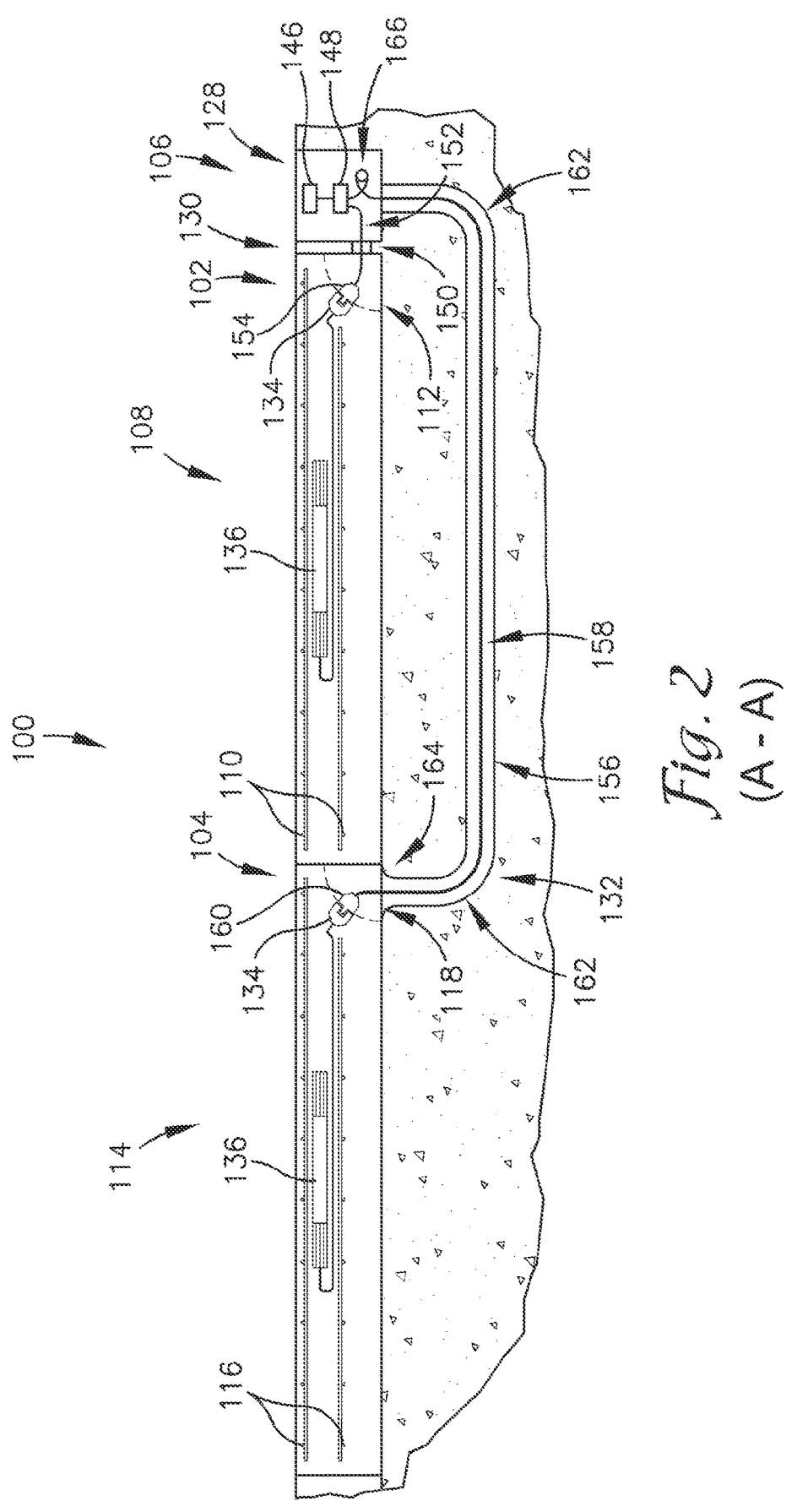
FIG. 2 is a cross-sectional side view taken along line A-A of FIG. 1, illustrating an installed position of an embodiment of the present invention.
Figure 3:
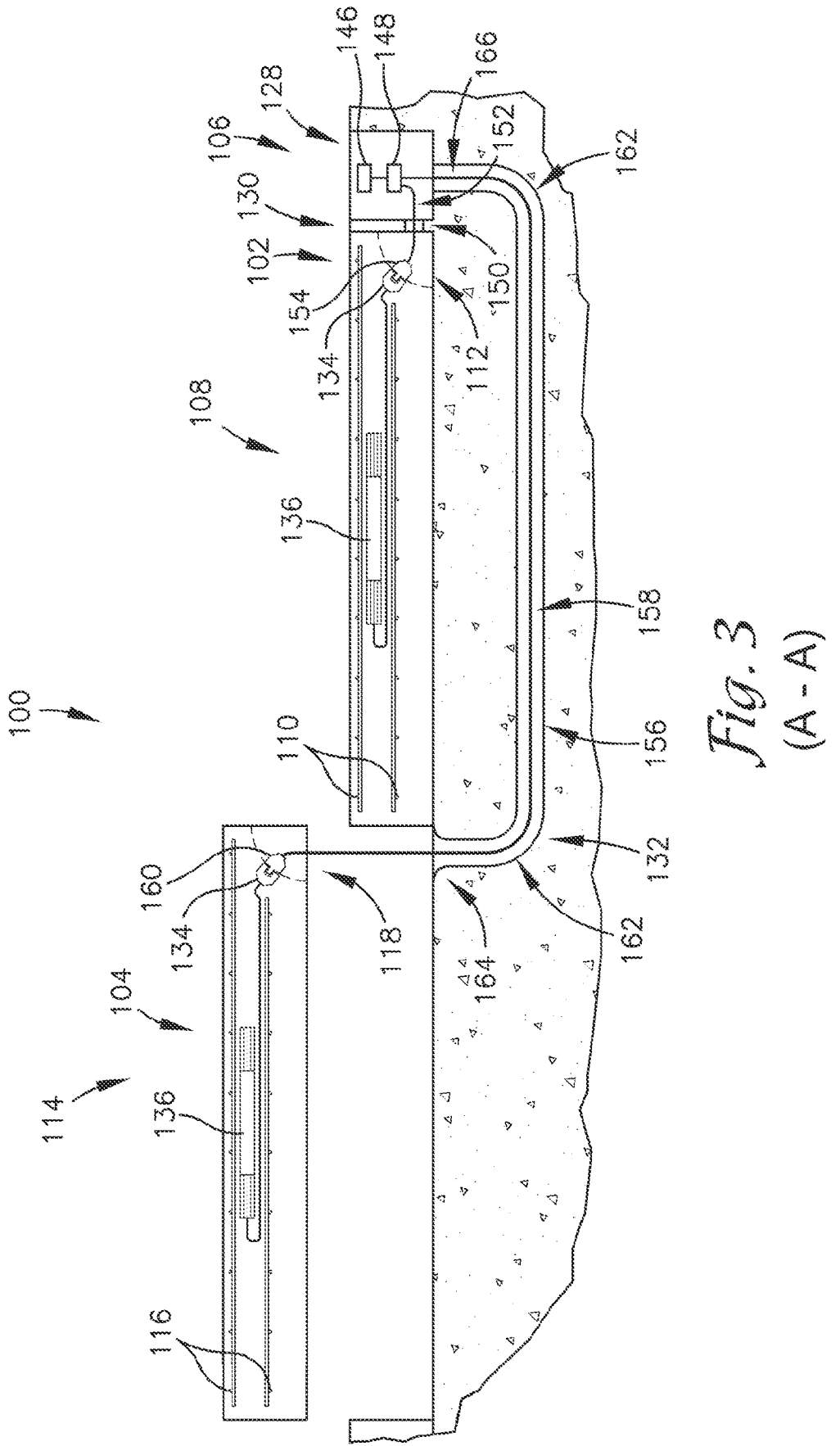
FIG. 3 is a cross-sectional side view taken along line A-A of FIG. 1, illustrating a maintenance position of the embodiment of FIG. 2.

Turning to FIGS. 1-3, a precast slab roadway 100 constructed in accordance with an embodiment of the invention is illustrated. The precast slab roadway 100 broadly comprises a plurality of proximal slabs 102, a plurality of distal slabs 104, and a roadway charging system 106.

The proximal slabs 102 are arranged end-to-end to form an outer vehicle lane 108 and may be composed primarily of precast concrete pavement. The proximal slabs 102 may also or alternatively comprise asphalt, plastic material, fiberglass, carbon fiber, geopolymers and/or other materials that may serve as and/or support driving surfaces without departing from the spirit of the present inventive concept. The proximal slabs 102 may be formed of cast-in-place concrete installations, continuous pour asphalt pavement material, or other pavement types. In cast-in-place installations, roadway sections may include lengths of roadway separated by saw cut joints typically made to reduce the chances of roadway damage/cracking from cyclical expansion and contraction.

The proximal slabs 102 may also include ferrous and/or nonferrous reinforcements 110 (see FIG. 2). The reinforcements 110 may be comprised of at least one layer of steel rebar lattice or other internal reinforcement structures such as fiberglass reinforcement mat, geotechnical mat, carbon fiber mat, or loose reinforcement material such as fiberglass fibers, carbon fibers, plastic fibers, metallic shavings, or any geogrid materials.

Each of the proximal slabs 102 houses a slab terminal and a plurality of wireless chargers of the roadway charging system 106 (described in more detail below). Each of the proximal slabs 102 may also include a recess 112 near its proximal, bottom corner for receiving a corresponding supply terminal of the roadway charging system 106.

The proximal slabs 102 may be configured to be lifted vertically for maintenance or modification. To that end, the proximal slabs 102 may include spaced apart access ports housing embedded lifting receivers for balanced lifting thereof. In one or more embodiments, the slabs 102, 104 may each incorporate a plurality of spaced ports and corresponding lift lugs balanced across upper surfaces thereof to facilitate lifting, as disclosed in U.S. Pat. No. 9,920,490 to Sylvester, issued Mar. 20, 2018, the entirety of which is hereby incorporated by reference herein. (See, e.g., description of receiver ports 118, lugs and FIG. 8, as well as lifting shown in FIGS. 13-14, and related installation and removal steps).

The distal slabs 104 are arranged end-to-end adjacent to the proximal slabs 102 to form an inner vehicle lane 114 adjacent to the outer vehicle lane 108 and may be composed primarily of precast concrete pavement. The distal slabs 104 may also or alternatively comprise asphalt, plastic material, fiberglass, carbon fiber, geopolymers and/or other materials that may serve as and/or support driving surfaces without departing from the spirit of the present inventive concept. The distal slabs 104 may be formed of cast-in-place concrete installations, continuous pour asphalt pavement material, or other pavement types. In cast-in-place installations, roadway sections may include lengths of roadway separated by saw cut joints typically made to reduce the chances of roadway damage/cracking from cyclical expansion and contraction.

The distal slabs 104 may also include ferrous and/or non-ferrous reinforcements 116. The reinforcements 116 may be comprised of at least one layer of steel rebar lattice or other internal reinforcement structures such as fiberglass reinforcement mat, geotechnical mat, carbon fiber mat, or loose reinforcement material such as fiberglass fibers, carbon fibers, plastic fibers, metallic shavings, or any geogrid materials.

Each of the distal slabs 104 houses a slab terminal and a plurality of wireless chargers of the roadway charging system 106 (described in more detail below). Each of the distal slabs 104 may include a recess 118 near its proximal, bottom corner for receiving the corresponding supply terminal of the roadway charging system 106.

The distal slabs 104 may be configured to be lifted vertically for maintenance or modification. To that end, the distal slabs 104 may include spaced apart access ports housing embedded lifting receivers for balanced lifting thereof, substantially in accordance with the description of lifting provided for slabs 102 above.

The proximal slabs 102 may be connected to each other, and similarly the distal slabs 104 may be connected to each other, via load transferring connectors 172 set in cavities 170 along sides of the proximal slabs 102 and distal slabs 104 extending perpendicular to the direction of travel. In one or more embodiments, load transferring connectors also join the proximal slabs 102 to adjacent distal slabs 104. The load transferring connectors 172 may comprise, for example, dowel rods. However, in one or more embodiments, adjacent slabs 102, 104 may be joined via tie bars or other load transferring connectors. Interfaces between slabs 102, 104 may also or alternatively incorporate a rubber skirt, backer board, spacing rod, tar mixture, grouting, or similar buffering substance within the scope of the present invention. It is also foreseen that load-transferring connectors may be omitted along one or more sides of slabs or roadway sections without departing from the spirit of the present invention.

The roadway charging system 106 broadly comprises switchgear 122, a containerized solution or control station 124, one or more main conductors 126, a plurality of junction boxes 128, a plurality of proximal slab connectivity assemblies 130, a plurality of distal slab connectivity assemblies 132, a plurality of slab terminals 134, and a plurality of wireless chargers 136. The roadway charging system 106 may be electrically connected to a utility service via a transformer 120.

The switchgear 122 selectively connects the roadway charging system 106 to the transformer 120. To that end, the switchgear 122 may include a plurality of switches and/or other electrical controls.

The control station 124 may include a rectifier 138, an inverter 140, a circuit breaker 142, and a master controller 144. The control station 124 may be connected between the switchgear 122 and the junction boxes 128 via the main conductors 126.

The rectifier 138 converts an alternating current (AC) from the switchgear to a direct current (DC) for use by the inverter 140. The rectifier 138 may be, for example, a 750 kW rectifier or any other suitable rectifier.

The inverter 140 converts the DC from the rectifier 138 to an AC usable by the master controller 144 and the down-current components of the roadway charging system 106. The inverter 140 may be, for example, a 750 kW high frequency inverter or any other suitable inverter.

The circuit breaker 142 protects down-current components of the roadway charging system 106 from dangerous current or power surges. To that end, the circuit breaker 142 may be positioned down-current of the inverter 140.

The master controller 144 manages electrical current to the down-current components of the roadway charging system 106 and may be in electronic communication with the switching device and tuning network described below. The electronic communication may allow the switching device and tuning network to provide data regarding operation and/or faults of the wireless chargers 136 and/or supporting power supply or control infrastructure and/or intermediate components. The electronic communication may also or alternatively permit the master controller 144 to communicate commands to the electronic components of the junction box 128 and/or components of the wireless chargers 136, for example where the master controller 144 commands one or more switching devices to power or shut down power to the corresponding wireless charger(s) or commands one or more network tuning device(s) to increase or decrease voltage of the power supplied to the corresponding wireless charger(s). The master controller 144 may be a remote compact controller (RCC) or any other suitable controller.

The main conductors 126 electrically connect the control station 124 to the junction boxes 128. The main conductors 126 may be 750 kcmil wires or any other suitable wires.

Each junction box 128 may contain or include one or more switching devices 146 and corresponding tuning network device(s) 148, with each pair of switching device 146 and tuning network device 148 supplying power to one of the wireless chargers 136. The switching device 146 may, for example, be a metal-oxide-semiconductor field-effect transistor (MOSFET) switch, a Silicon Carbide (SIC) switching device, or any other switching device for switching and/or amplifying the power signal to the corresponding wireless charger 136. The tuning network device 148 may, for example, be a transformer configured to increase or decrease the voltage and/or other characteristics of the power for supply to the corresponding wireless charger 136. The switching device 146 and tuning network device 148 may improve the quality of the electrical current before it reaches the corresponding wireless chargers 136, which results in higher charging efficiency and less interference. The wires or conductors carrying the power to the wireless chargers 136 may be routed through one or more electrical conductors as described in more detail below.

The proximal slab connectivity assemblies 130 facilitate electrical connection of the wireless chargers 136 of the proximal slabs 102 to the junction boxes 128. The proximal slab connectivity assemblies 130 may include a conduit 150, one or more electrical conductors 152, and a supply terminal 154.

The conduit 150 may extend directly from the corresponding junction box 128 and the corresponding proximal slab 102. The conduit 150 may be a Schedule 80 PVC conduit or any other suitable conduit and may include a long-life high resilience grease for allowing movement of the electrical conductors 152.

The electrical conductors 152 are housed in the conduit 150 and electrically connect the wireless chargers 136 of the corresponding proximal slab 102 (described in more detail below) to corresponding switching devices 146 and tuning network devices 148. In one or more embodiments, the proximal slab connectivity assemblies 130 include one electrical conductor 152 per wireless charger 136. The electrical conductors 152 may be Litz wire or any other suitable electrical conductor and may include an electrical insulation coating.

The supply terminal 154 is configured to connect to the slab terminal 134 of a corresponding proximal slab 102. In one or more embodiments, the supply terminal 154 comprises a port, a plug, or the like. In one or more embodiments, the supply terminal 154 is a male connector configured to mate with a female slab terminal 134.

The distal slab connectivity assemblies 132 facilitate electrical connection of the wireless chargers 136 of the distal slabs 104 to the junction boxes 128. The distal slab connectivity assemblies 132 may include a subgrade conduit 156, one or more electrical conductors 158, and a supply terminal 160.

The subgrade conduit 156 may extend downward from the corresponding junction box 128, horizontally underneath the proximal slab 102 adjacent the corresponding distal slab 104, and upward toward the corresponding distal slab 104. The subgrade conduit 156 may have curved portions 162 (e.g., ninety degree sweeps near its proximal and distal ends) to assist in feeding the electrical conductors 158 through the subgrade conduit 156. The subgrade conduit 156 may also include a flared opening 164 near its distal end to facilitate installation and maintenance. The subgrade conduit 156 may be a Schedule 80 PVC conduit or any other suitable conduit and may include a long-life high resilience grease for allowing movement of the electrical conductors 158.

The electrical conductors 158 are housed in the subgrade conduit 156 and electrically connect the wireless chargers 136 of the corresponding distal slab 104 (described in more detail below) to corresponding switching devices 146 and tuning network devices 148. In one or more embodiments, the distal slab connectivity assemblies 132 include one electrical conductor 158 per wireless charger 136. The electrical conductors 158 may be Litz wire or any other suitable electrical conductors and may include an electrical insulation coating.

In one or more embodiments, each of the electrical conductors 158 may include a slack portion 166 configured to be stored in the corresponding junction box 128 when slabs 104 are in installed positions. The slack portion 166 may have a length equal to or greater than a height required to raise the corresponding distal slab 104 during maintenance. This height (and hence the length of the slack portion 166) may be at least equal to a thickness of the adjacent proximal slab 102, and preferably at least twice as much as the thickness of the adjacent proximal slab 102. The slack portion 166 may be loosely coiled in the corresponding junction box 128 so that lifting the corresponding distal slab 104 results in the electrical conductors 158 and the corresponding slack portion(s) 166 being drawn at least partially through the subgrade conduit 156, as described in more detail below.

In another embodiment, each slack portion 166 is housed in one of the junction boxes 128 in an installed configuration and leads directly from the opening of the subgrade conduit 156 to an immediate upstream electrical component (e.g., one of the tuning network devices 148) fixed relative to the junction box 128. The subgrade conduit 156 may be spaced from the immediate upstream electrical component by a gap distance, and the slack portion 166 housed in the junction box 128 in the installed configuration may have a length at least 1.5 times, preferably 2 times, and more preferably 3-5 times greater than the gap distance.

Figure 4:
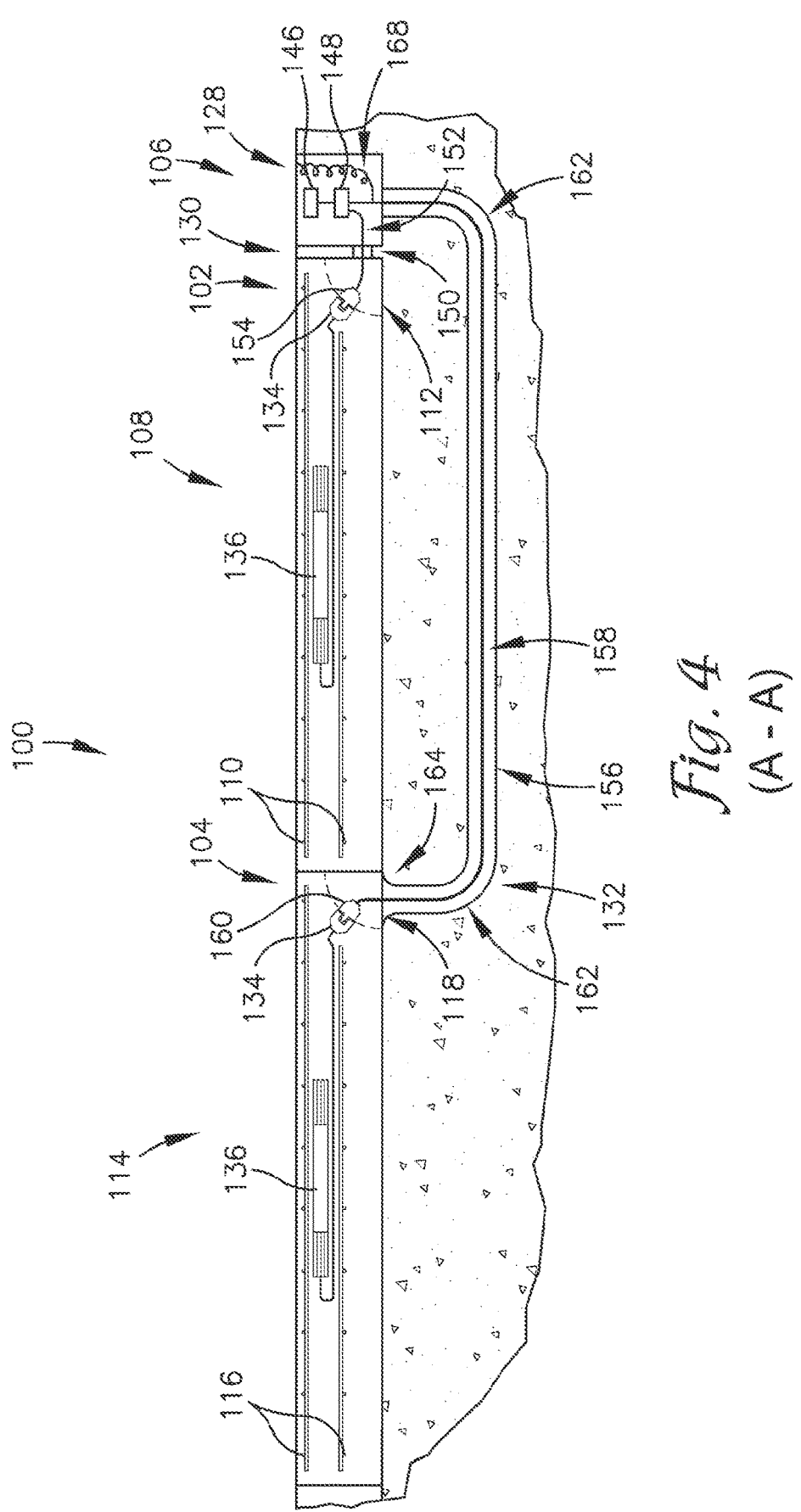
FIG. 4 is a cross-sectional side view taken along line A-A of FIG. 1, illustrating an installed position in accordance with another embodiment of the invention.
Figure 5:
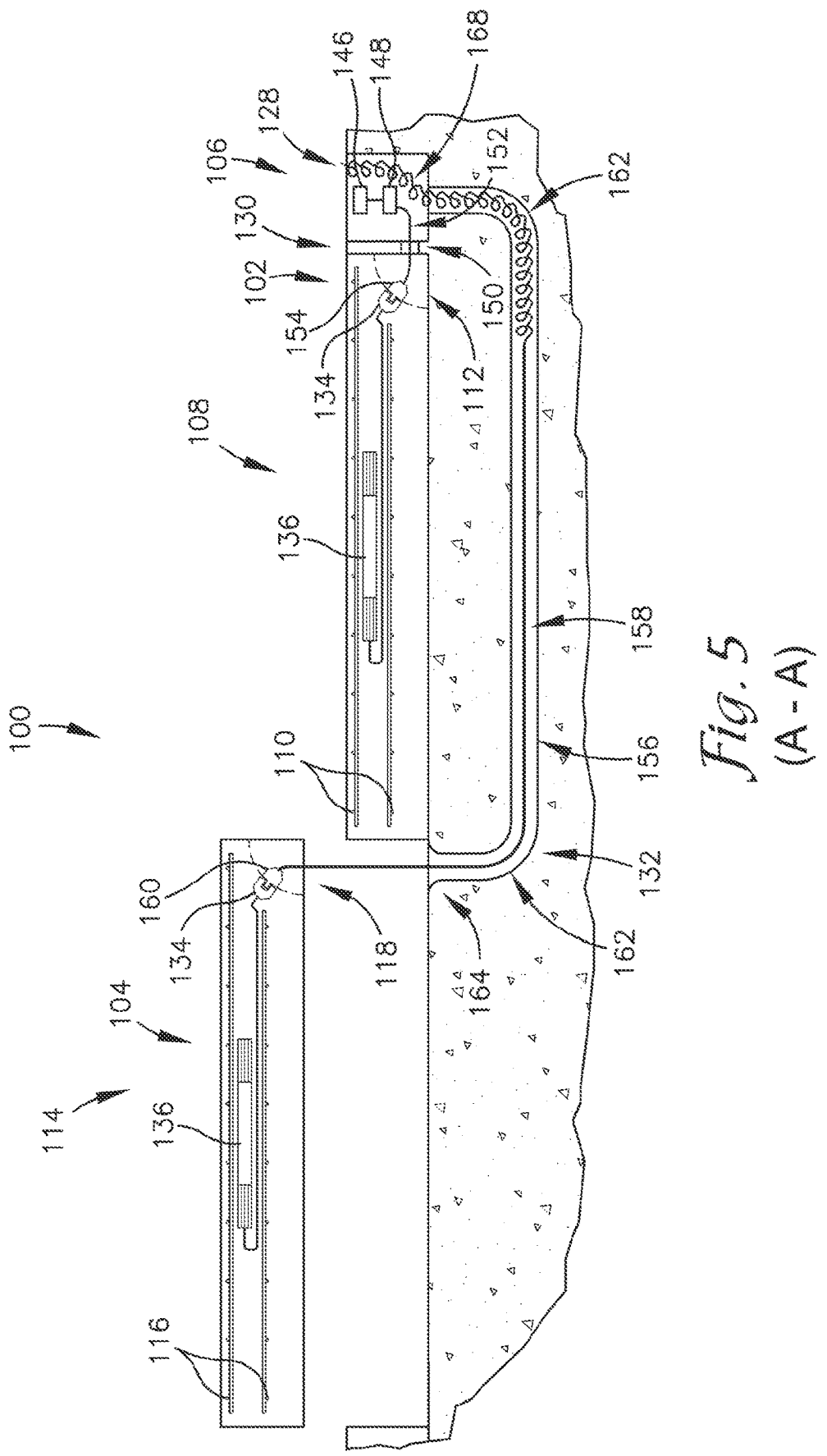
FIG. 5 is a cross-sectional side view taken along line A-A of FIG. 1 of a maintenance position according to the embodiment shown in FIG. 4.

In another embodiment, as shown in FIGS. 1, 4, and 5, proximal ends of each of the electrical conductors 158 (near the corresponding junction box 128) may also or alternatively be attached to a lead line 168. The lead line 168 may have a length equal to or greater than a height required to raise the corresponding distal slab 104 during maintenance. This height (and hence the length of the lead line 168) may be at least equal to a thickness of the adjacent proximal slab 102, and preferably at least twice as much as the thickness of the adjacent proximal slab 102. The lead line 168 may be loosely coiled in the corresponding junction box 128 in an installed configuration so that lifting the corresponding distal slab 104 results in the electrical conductors 158 and the corresponding lead line 168 being drawn at least partially through the subgrade conduit 156, as described in more detail below.

The supply terminal 160 is configured to connect to the slab terminal 134 of a corresponding distal slab 104. In one or more embodiments, the supply terminal 160 comprises a port, a plug, or the like. In one or more embodiments, the supply terminal 160 is a male connector configured to mate with a female slab terminal 134. One of ordinary skill will appreciate, however, that electrical plugs or terminals may alternate between male and female role within the scope of the present invention.

Each of the plurality of slab terminals 134 is configured to connect to the supply terminal of a corresponding proximal slab connectivity assembly 130 or distal slab connectivity assembly 132. In one or more embodiments, the slab terminals 134 are female connectors configured to mate with male supply terminals. The slab terminal 134 (and hence the corresponding supply terminal) may be angled between approximately 30 degrees and 60 degrees, and preferably 45 degrees, to facilitate disconnection during maintenance.

The wireless chargers 136 are wireless charge emitters and/or transceivers and may be coiled about a vertical axis for charging vehicles in the corresponding lane. The wireless chargers 136 may include conductive material configured to conduct current of supplied power in a spatial pattern that generates and projects an electromagnetic (EMF) field extending up and above the top surface of the corresponding roadway section for wireless battery charging of passing vehicles (e.g., according to Faraday's law of induced voltage). It should be noted that "wireless" in this case refers to the lack of wires between the chargers and the vehicles being charged. Each of the plurality of wireless chargers 136 may be configured for unidirectional charging of batteries of vehicles passing along a top surface of the proximal slabs 102 or distal slabs 104. One of ordinary skill will appreciate that an individual slab or roadway section may include more or fewer wireless chargers at different and/or variable spacing and/or of different configuration/shape without departing form the spirit of the present invention. The wireless chargers may be 50 kW coils or any other suitable chargers. In one or more embodiments, each proximal slab 102 and distal slab 104 includes three wireless chargers aligned with the corresponding lane. In one or more embodiments, the wireless chargers may be dynamic wireless power transfer (DWPT) coils or the like. Power to the wireless chargers 136 is supplied, conditioned, tuned, transformed, converted and/or otherwise changed and/or controlled by the aforementioned components of the roadway charging system 106.

Turning to FIG. 6 and with reference to FIGS. 2 and 3, a method of constructing a precast slab roadway will now be described in more detail. First, the subgrade conduits 156 may be assembled, as shown in block 200. This may include connecting straight sections and curved sweep sections together end-to-end. The subgrade conduits 156 may be spaced apart from each other at slab-length intervals and positioned below a grade level, as shown in block 202. The subgrade conduits 156 may be buried in substrate, as shown in block 204. The junction boxes 128 may be spaced apart from each other at slab-length intervals and installed near proximal ends of the subgrade conduits 156, as shown in block 206. The electrical conductors 158 may be fed through the subgrade conduits 156, with the slack portion 166 being stored in the junction boxes 128, as shown in block 208. This step 208 may be performed before or after burial of the subgrade conduits 156.

The conduits 150 may be installed with the junction boxes 128, as shown in block 210. The electrical conductors 152 may also be fed through the conduits 150, as shown in block 212.

The proximal slabs 102 may be lowered onto the substrate and positioned end-to-end to form a proximal lane, as shown in block 214. To that end, the recesses 112 of the proximal slabs 102 may be positioned over the conduits 150 and supply terminals 154. The supply terminals 154 may also be connected to the slab terminals 134 of the proximal slabs 102, as shown in block 216. The proximal slabs 102 may also be connected together via the load transfer connectors 172. To that end, the load transfer connectors 172 may be moved from male sockets into corresponding female sockets to secure the proximal slabs 102 together. In one or more embodiments, structure and processes for housing, using and installing/de-installing load transfer connectors may be incorporated from U.S. Pat. No. 9,920,490 to Sylvester, incorporated by reference herein, for implementation with any load-transferring connectors described herein.

With the distal slabs 104 held above their intended installation position in a maintenance position (e.g., with a bottom of slab 104 held at a separation height above a top of installed slab 102, and preferably with a separation at least one and preferably two times greater than a thickness of the installed slab 102), the electrical conductors 158 may be pulled through the subgrade conduits 156, as shown in block 218. The supply terminals 160 may be connected to the slab terminals 134 of the distal slabs 104, as shown in block 220. To that end, the slack portion 166 may be drawn into the subgrade conduits 156 to ensure proximal ends of the electrical conductors 158 are not lost in the subgrade conduits 156. The electrical conductors 158 may be cut (or marked and cut later) to include the slack portion 166, as shown in block 222.

The distal slabs 104 may be lowered onto the substrate adjacent to the proximal slabs 102, as shown in block 224. To that end, the slack portion 166 may be pulled back out of the subgrade conduits 156 as the distal slabs are lowered. The electrical conductors 158 may also be connected to electrical connectors of the junction boxes 128, as shown in block 226. The slack portion 166 may be stored in the junction boxes 128, as shown in block 228. The distal slabs 104 may also be connected together via the load transfer connectors 172. To that end, the load transfer connectors 172 may be moved from male sockets into corresponding female sockets to secure the distal slabs 104 together.

Figure 7:
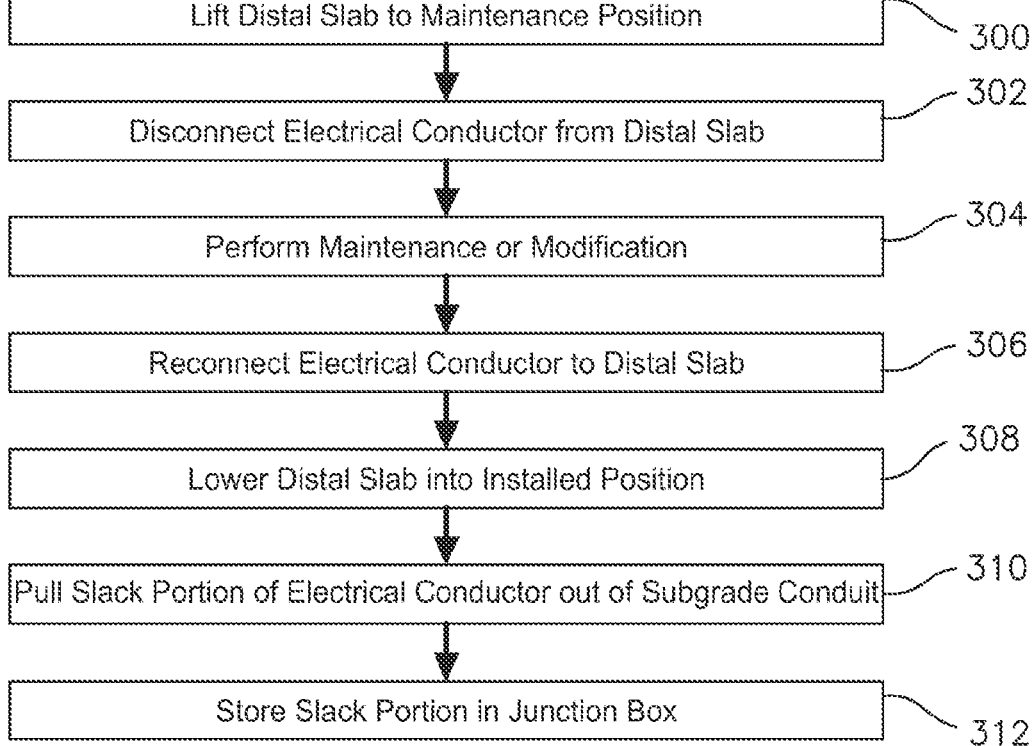
FIG. 7 is a flow diagram of certain method steps of another embodiment of the invention.

Turning to FIG. 7 and with reference to FIGS. 2 and 3, maintenance or modification of the precast slab roadway 100, and a distal slab 104 in particular, may be performed as follows. The distal slab 104 may be lifted to a maintenance position, as shown in block 300. To that end, the load transfer connectors 172 may be moved from female sockets of the cavities 170 into corresponding male sockets to disconnect the distal slab 104 from adjacent distal slabs. Furthermore, the distal slab 104 may pull the corresponding electrical conductor 158 through the subgrade conduit 156 and hence may draw the slack portion 166 into the subgrade conduit 156. The electrical conductor 158 may be disconnected from the distal slab 104 via the supply terminal 160 and the slab terminal 134 of the distal slab 104 if needed, as shown in block 302. Maintenance or modification of the distal slab 104, an adjacent slab, the substrate, or any other accessible component of the roadway charging system 106 or precast slab roadway 100 may be performed, as shown in block 304. For example, a distal slab 104 may be replaced with a functional distal slab 104, the original distal slab 104 may be repaired or its electrical components may be replaced or augmented. One of ordinary skill will appreciate that a variety of maintenance and modification operations are within the scope of the present invention.

The electrical conductor 158 may be reconnected to the distal slab 104 if it was disconnected, as shown in block 306. The distal slab 104 may be lowered back to its installed position (e.g., resting on the substrate or at grade), as shown in block 308. To that end, the load transfer connectors 172 may be moved from the male sockets of the cavities 170 into corresponding female sockets to reconnect the distal slab 104 to adjacent distal slabs. The slack portion 166 of the electrical conductor 158 may also be pulled out of the subgrade conduit 156 and hence draw the electrical conductor 158 back into the subgrade conduit 156, as shown in block 310. The slack portion 166 may be returned to its stored location in the junction box 128, as shown in block 312.

Turning to FIG. 8 and with reference to FIGS. 4 and 5, a method of constructing a precast slab roadway will now be described in more detail. The subgrade conduits 156 may be assembled, as shown in block 400. This may include connecting straight sections and curved sweep sections together end-to-end. The subgrade conduits 156 may be spaced apart from each other at slab-length intervals and positioned below a grade level, as shown in block 402. The subgrade conduits 156 may be buried in substrate, as shown in block 404. The junction boxes 128 may be spaced apart from each other at slab-length intervals and installed near proximal ends of the subgrade conduits 156, as shown in block 406.

The conduits 150 may be installed with the junction boxes 128, as shown in block 408. The electrical conductors 152 may also be fed through the conduits 150, as shown in block 410.

The proximal slabs 102 may be lowered onto the substrate and positioned end-to-end to form a proximal lane, as shown in block 412. To that end, the recesses 112 of the proximal slabs 102 may be positioned over the conduits 150 and supply terminals 154. The supply terminals 154 may also be connected to the slab terminals 134 of the proximal slabs 102, as shown in block 414. The proximal slabs 102 may also be connected together via the load transfer connectors 172. To that end, the load transfer connectors 172 may be moved from male sockets into corresponding female sockets to secure the proximal slabs 102 together.

The electrical conductors 158 may be cut to an installation length, as shown in block 416, and may optionally include slack portions. Lead lines 168 may be attached to proximal ends of the electrical conductors 158, as shown in block 418. With the distal slabs 104 held at maintenance positions, the electrical conductors 158 may be fed through the subgrade conduits 156, as shown in block 420. To that end, the lead lines 168 may be drawn into the subgrade conduits 156 to ensure proximal ends of the electrical conductors 158 are not lost in the subgrade conduits 156. This step 420 may be performed before or after burial of the subgrade conduits 156. The supply terminals 160 may also be connected to the slab terminals 134 of the distal slabs 104, as shown in block 422.

The distal slabs 104 may be lowered onto the substrate adjacent to the proximal slabs 102, as shown in block 424. The lead lines 168 may be pulled back out of the subgrade conduits 156 as (or after) the distal slabs are lowered so that the proximal ends of the electrical conductors 158 are drawn back out of the subgrade conduit 156, as shown in block 426. The electrical conductors 158 may also be connected to electrical connectors of the junction boxes 128. The lead lines 168 may be removed from the proximal ends of the electrical conductors 158 and optionally stored in the junction boxes 128, as shown in blocks 428 and 430. The lead lines 168 may optionally be left connected to the conductors 158 and stored in the junction boxes 128. The distal slabs 104 may also be connected together via the load transfer connectors 172. To that end, the load transfer connectors 172 may be moved from male sockets into corresponding female sockets to secure the distal slabs 104 together.

Turning to FIG. 9 and with reference to FIGS. 4 and 5, a method of maintenance or modification of the precast slab roadway 100, and a distal slab 104 in particular, may be performed as follows. A lead line 168 may be attached to a proximal end of the electrical conductor 158, as shown in block 500. The proximal end of the electrical conductor 158 may be detached from electrical components of the junction box 128, as shown in block 502. The distal slab 104 may be lifted to a maintenance position, as shown in block 504. To that end, the load transfer connectors 172 may be moved from female sockets of the cavities 170 into corresponding male sockets to disconnect the distal slab 104 from adjacent distal slabs. The distal slab 104 may also pull the corresponding electrical conductor 158 through the subgrade conduit 156 and hence may draw a portion of the lead line 168 into the subgrade conduit 156. The electrical conductor 158 may be disconnected from the distal slab 104 via the supply terminal 160 and the slab terminal 134 if needed, as shown in block 506. Maintenance or modification of the distal slab 104, an adjacent slab, the substrate, or any other accessible component of the roadway charging system 106 or precast slab roadway 100 may be performed, as shown in block 508.

The electrical conductor 158 may be reconnected to the distal slab 104 if it was disconnected, as shown in block 510. The distal slab 104 may be lowered back to its installed position, as shown in block 512. To that end, the load transfer connectors 172 may be moved from the male sockets of the cavities 170 into corresponding female sockets to reconnect the distal slab 104 to adjacent distal slabs. The lead line 168 may also be pulled out of the subgrade conduit 156 and hence draw the electrical conductor 158 back into the subgrade conduit 156 so that the proximal end of the electrical conductor 158 is drawn back out of the subgrade conduit 156, as shown in block 514. The electrical conductor 158 may be reconnected to the electrical components of the junction box 128, as shown in block 516. The lead line 168 may be removed and/or stored in the junction box 128, as shown in block 518.

Although the invention has been described with reference to the embodiments illustrated in the attached drawing FIGURES, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A method of constructing a precast slab roadway, the method comprising:

passing an electrical conductor through a subgrade conduit so that a distal end of the electrical conductor extends out of a distal end of the subgrade conduit and so that a proximal end and an adjacent proximal end slack portion of the electrical conductor extend out of a proximal end of the subgrade conduit, the slack portion having a length equal to or greater than a height difference between a maintenance position of a corresponding distal slab and an installed position of the corresponding distal slab;

installing the subgrade conduit beneath a proximal slab;

pulling a distal portion of the electrical conductor adjacent the distal end of the electrical conductor from the distal end of the subgrade conduit so that the slack portion is drawn into the subgrade conduit;

electrically connecting the electrical conductor to an electrical component of a junction box;

electrically connecting an electronic component of the corresponding distal slab to the distal end of the electrical conductor;

lowering the distal slab onto a substrate adjacent to the proximal slab; and pulling the slack portion of the electrical conductor out of the subgrade conduit so the distal portion of the electrical conductor is drawn into the subgrade conduit.

2. The method of claim 1, the step of electrically connecting the electrical component of the corresponding distal slab to the distal end of the electrical conductor including mating an electrical connector of the distal slab and an electrical connector of the electrical conductor.

3. The method of claim 2, the distal slab including a recess for receiving the electrical connector of the electrical conductor.

4. The method of claim 2, further comprising a step of orienting the electrical connector of the distal slab and the electrical connector of the electrical conductor at an angle between thirty degrees and sixty degrees from horizontal.

5. The method of claim 1, the distal end of the subgrade conduit having a flared opening.

6. The method of claim 1, the subgrade conduit including curved portions to aid movement of the electrical conductor therein.

7. The method of claim 1, further comprising a step of assembling the subgrade conduit from a plurality of conduit pieces.

8. The method of claim 1, further comprising, after the step of pulling the slack portion, additional steps of:

lifting the distal slab from the installed position to the maintenance position;

pulling the distal portion of the electrical conductor from the distal end of the subgrade conduit so that the slack portion is drawn into the subgrade conduit;

performing maintenance on or modifying the distal slab;

lowering the distal slab from the maintenance position to the installed position; and pulling the slack portion from the proximal end of the subgrade conduit so the distal portion of the electrical conductor is drawn into the subgrade conduit.

9. The method of claim 1, further comprising a step of storing the slack portion in the junction box.

10. The method of claim 1, further comprising steps of moving load transfer connectors to extend between cavities of adjacent proximal slabs to connect the adjacent proximal slabs together and moving additional load transfer connectors to extend between cavities of adjacent distal slabs to connect the adjacent distal slabs together.

11. The method of claim 1, wherein the electronic component of the corresponding distal slab is a wireless charger.

12. A method of maintaining a precast slab roadway, the method comprising:

lifting a distal slab adjacent to a proximal slab from an installed position to a maintenance position so that the distal slab pulls a distal portion of an electrical conductor out of a distal end of a subgrade conduit underneath the proximal slab, the lifting drawing a slack portion of the electrical conductor from a junction box adjacent the proximal slab opposite the distal slab into a proximal end of the subgrade conduit, the slack portion having a length equal to or greater than a height difference between the maintenance position and the installed position;

performing a maintenance action or a modification action on at least one of the distal slab, the proximal slab, an electrical component, and a substrate configured to support the distal slab;

lowering the distal slab from the maintenance position to the installed position on the substrate adjacent to the proximal slab; and pulling the slack portion of the electrical conductor out of the proximal end of the subgrade conduit so the distal portion of the electrical conductor is drawn into the distal end of the subgrade conduit.

13. The method of claim 12, further comprising steps of:

disconnecting the electrical conductor from the distal slab before performing the maintenance action or modification action; and reconnecting the electrical conductor to the distal slab after performing the maintenance action or modification action.

14. The method of claim 13, the electrical conductor including an electrical connector, the distal slab including a recess for receiving the electrical connector.

15. The method of claim 13, the distal slab including an electrical connector oriented at an angle between thirty degrees and sixty degrees from horizontal and the electrical conductor including an electrical connector, the method further comprising a step of orienting the electrical connector of the electrical conductor at an angle between thirty degrees and sixty degrees from horizontal to mate the electrical connector of the electrical conductor and the electrical connector of the distal slab together.

16. The method of claim 12, the distal end of the subgrade conduit having a flared opening.

17. The method of claim 12, the subgrade conduit including curved portions to aid movement of the electrical conductor therein.

18. The method of claim 12, further comprising a step of storing the slack portion in the junction box.

19. The method of claim 12, further comprising a step of moving load transfer connectors extending between cavities of adjacent distal slabs including the distal slab to be lifted to disconnect the adjacent distal slabs.

20. The method of claim 12, wherein the electrical component is a wireless charger.

21. A precast slab roadway comprising:

a plurality of proximal slabs arranged end-to-end forming an inner lane;

a plurality of distal slabs arranged end-to-end adjacent to the proximal slabs forming an outer lane, each of the plurality of distal slabs being configured to be raised from an installed position to a maintenance position; and a roadway electrical component system comprising:

a plurality of junction boxes adjacent to the proximal slabs opposite the distal slabs, each of the plurality of junction boxes including one or more electrical components;

a plurality of electrical components embedded in the distal slabs;

a plurality of subgrade conduits extending below the proximal slabs from the plurality of junction boxes to the plurality of distal slabs, each of the plurality of subgrade conduits including a proximal end; and a plurality of electrical conductors extending respectively through the plurality of subgrade conduits and electrically connecting the corresponding plurality of electrical components in the distal slabs to the corresponding plurality of electrical components of the plurality of junction boxes, each of the plurality of electrical conductors including a proximal end including a slack portion extending out of the corresponding proximal end of one of the plurality of subgrade conduits, the slack portion having a length equal to or greater than a height difference between the maintenance position of a corresponding distal slab and the installed position of the corresponding distal slab.

22. The precast slab roadway of claim 21, each of the plurality of electrical conductors including an electrical connector, each of the plurality of distal slabs including a recess for receiving one of the electrical connectors.

23. The precast slab roadway of claim 21, each of the plurality of subgrade conduits including a flared distal end.

24. The precast slab roadway of claim 21, each slack portion being stored in one of the plurality of junction boxes.

25. The precast slab roadway of claim 21, further comprising load transfer connectors extending between cavities of adjacent proximal slabs thereby reversibly connecting the adjacent proximal slabs together and additional load transfer connectors extending between cavities of adjacent distal slabs thereby reversibly connecting the adjacent distal slabs together.

26. The precast slab roadway of claim 21, wherein the plurality of electrical components embedded in the distal slabs are wireless chargers.

*　*　*　*　*